(12) United States Patent
Zhang et al.

(10) Patent No.: US 7,545,985 B2
(45) Date of Patent: Jun. 9, 2009

(54) METHOD AND SYSTEM FOR LEARNING-BASED QUALITY ASSESSMENT OF IMAGES

(75) Inventors: Hong-Jiang Zhang, Beijing (CN); Ming Jing Li, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/029,913

(22) Filed: Jan. 4, 2005

(65) Prior Publication Data

US 2006/0147107 A1 Jul. 6, 2006

(51) Int. Cl.
*G06K 9/62* (2006.01)
(52) U.S. Cl. ...................................... 382/224; 382/227
(58) Field of Classification Search ................. 382/224, 382/227
See application file for complete search history.

(56) References Cited

U.S. PATENT DOCUMENTS

| 7,099,510 B2 * | 8/2006 | Jones et al. ................. 382/225 |
| 2007/0112585 A1 * | 5/2007 | Breiter et al. .................. 705/2 |

OTHER PUBLICATIONS

Athitsos, Vassilis and Michael J. Swain, "Distinguishing Photographs and Graphics on the World Wide Web," 1997, IEEE Workshop on CBAIVL, (7 pages).

Chang, Tianhorng and C. C. Jay Kuo, "Texture Analysis and Classification with Tree-Structured Wavelet Transform," Feb. 19, 1993, IEEE Transactions on Image Processing, vol. 2, No. 4, Oct. 1993, © 1993 IEEE, pp. 429-441.
Hasler, David and Susstrunk, Sabine, "Measuring Colourfulness in Natural Images," 2003 (9 pages).
He, Jingrui et al., "W-Boost and Its Application to Web Image Classification," Proceedings of the 17th International Conference on Pattern Recognition (ICPR'04), IEEE, 2004 (4 pages).
Huang, Jing et al., "Image Indexing Using Color Correlograms," CVPR, 1997, (7 pages).
Ma, Yu-Fei et al., "A User Attention Model for Video Summarization," ACM Multimedia '02, Dec. 2002 (10 pages).
Mallat, Stephane G., "A Theory for Multiresolution Signal Decomposition: The Wavelet Representation," Jul. 1989, IEEE Transactions on Pattern Analysis and Machine Intelligence, vol. 11, No. 7, © 1989 IEEE, pp. 674-693.
Mao, Jianchang and Anil K. Jain, "Texture Classification and Segmentation Using Multiresolution Simultaneous Autoregressive Models," Jun. 10, 1991, Pattern Recognition, vol. 25, No. 2, 1992, © 1992 Pattern Recognition Society, pp. 173-188.

(Continued)

*Primary Examiner*—Matthew C Bella
*Assistant Examiner*—Mike Rahmjoo
(74) *Attorney, Agent, or Firm*—Perkins Coie LLP (57) ABSTRACT

A method and system for learning-based assessment of the quality of an image is provided. An image quality assessment system trains an image classifier based on a training set of sample images that have quality ratings. To train the classifier, the assessment system generates a feature vector for each sample image representing various attributes of the image. The assessment system may train the classifier using an adaptive boosting technique to calculate a quality score for an image. Once the classifier is trained, the assessment system may calculate the quality of an image by generating a feature vector for that image and applying the trained classifier to the feature vector to calculate the quality score for the image.

9 Claims, 6 Drawing Sheets

OTHER PUBLICATIONS

Pass, Greg, Ramin Zabih and Justin Miller, "Comparing Images Using Color Coherence Vectors," ACM Multimedia, 1997 (14 pages).

Ridgeway, Greg, "The State of Boosting," Computing Science and Statistics 31, 1999 (10 pages).

Stricker, Markus and Markus Orengo, "Similarity of Color Images," 1995, SPIE 2420 (12 pages).

Swain, Michael J. and Dana H. Ballard, "Color Indexing," Jun. 6, 1991, International Journal of Computer Vision, 7:1, 1991, © 1991 Kluwer Acadmeic Publishers, pp. 11-32.

Tamura, Hideyuki et al., "Textural Features Corresponding to Visual Perception," Jun. 1978, IEEE Transactions on SMC, vol. 8, No. 6, © 1978 IEEE, pp. 460-473.

Wang, James Ze et al., "Content-based image indexing and searching using Daubechies' wavelets," Int J Digit Libr, 1997, vol. 1, © Springer-Verlag 1997, pp. 311-328.

Winkler, Stefan, "Visual Fidelity and Perceived Quality: Towards Comprehensive Metrics," 2001 (12 pages).

* cited by examiner

METHOD AND SYSTEM FOR LEARNING-BASED QUALITY ASSESSMENT OF IMAGES

TECHNICAL FIELD

The described technology relates generally to assessing the quality of an image and particularly to no-reference quality assessment of an image.

BACKGROUND

Because of the popularity of digital photography, a rapidly increasing number of images in digital form are being created by both professionals and non-professionals. Many software tools are available to assist a photographer in the processing of these digital images. A photographer can use these software tools to manipulate digital images in various ways, such as adjusting the tint, brightness, contrast, size, and so on, to arrive at a high-quality image.

To help evaluate the quality of images, photographers and others would like a software tool that could automatically, accurately, and objectively assess image quality. Such an assessment of image quality could be used for quality control by professional photographers to evaluate image processing systems, to optimize algorithms and parameter settings for image processing, and to help non-professional photographers manage their digital images and assess their expertise.

Prior quality assessment techniques can be categorized as full-reference, reduced-reference, or no-reference techniques. A full-reference technique assesses the quality of a copy of an image based on analysis of differences from the original image. A reduced-reference technique assesses the quality of a copy of an image based on analysis of certain features derived from the original image. A no-reference technique assesses the quality of an image without any reference information. Although human observers can easily assess image quality without reference information, it can be complex and difficult for a software tool to assess image quality without any reference information.

Typical no-reference techniques focus on measuring the distortion within an image. Generally, these no-reference techniques identify a discriminative local feature of each pixel, assess the local distortion of that feature, and average the local distortions over the entire image. These no-reference techniques then use the average distortions to predict image quality that is consistent with a human observer. The local features used by these techniques include blurring, ringing, and blocking.

These local features, however, do not adequately represent the "holistic" image quality assessment performed by human observers. In particular, human observers rely on cognitive and aesthetic information within images, and not solely on distortion, to assess image quality. Research has indicated that scene composition and location as well as the people and their expressions are important attributes for assessing image quality. Because of the difficulty in assessing such subjective aspects of image quality, the no-reference techniques rely on features that can be physically measured such as contrast, sharpness, colorfulness, saturation, and depth of field when assessing image quality. These techniques, however, do not provide an image quality assessment that accurately reflects that of a human observer. It would be desirable to have a no-reference technique that would accurately reflect the subjective image quality of a human observer using objective measurements of an image.

SUMMARY

A method and system for learning-based assessment of the quality of an image is provided. An image quality assessment system trains an image classifier based on a training set of sample images that have quality ratings. To train the classifier, the assessment system generates a feature vector for each sample image representing various attributes of the image. The assessment system then trains the classifier to calculate a quality score for an image. Once the classifier is trained, the assessment system may calculate the quality of an image by generating a feature vector for that image and applying the trained classifier to the feature vector to calculate a quality score for the image.

DETAILED DESCRIPTION

A method and system for learning-based assessment of the quality of an image is provided. In one embodiment, an image quality assessment system trains an image classifier based on a training set of sample images that have quality ratings. The quality ratings of an image may be "high-quality" or "low-quality," although other rating scales may be used. To train the classifier, the assessment system generates a feature vector for each sample image representing various attributes (e.g., contrast and colorfulness) of the image. The assessment system may train the classifier using an adaptive boosting technique to calculate a quality score for an image. Once the classifier is trained, the assessment system may calculate the quality of an image by generating a feature vector for that image and applying the trained classifier to the feature vector to calculate the quality score for the image. In one embodiment, the assessment system may map the initial quality scores of the classifier to more closely reflect the scores of human observers. The assessment system may generate the mapping to minimize differences between quality scores calculated by the classifier and quality scores assigned by human observers on a set of evaluation images. In this way, the assessment system can automatically learn features of images with high-quality ratings and can accurately and objectively assess the quality of images by calculating quality scores.

To train the classifier in one embodiment, the assessment system generates a training set of sample images that includes high-quality and low-quality images. The training set may be represented by $E(i)$, where $i=1,2,\ldots,N$ and $N$ is the total number of sample images. The high-quality images are represented by $E^+(i)$, where $i=1,2,\ldots,N^+$ and $N^+$ is the total number of high-quality images. The low-quality images are represented by $E^-(i)$, where $i=1,2,\ldots,N^-$, $N^-$ is the total number of low-quality images, and $N^+ + N^- = N$. In one embodiment, the assessment system may assume that images taken by professional photographers are high-quality and that images taken by photographers who are not professionals are low-quality. The assumption saves the overhead of having a large number of human observers provide their assessment of image quality for a larger number of images and the overhead of establishing image quality when the assessments vary significantly. The assessment system represents each image by a feature vector represented by the following equation:

$$E(i) \rightarrow F(i)(i=1, 2, \ldots, N) \qquad (1)$$

where F(i) represents the feature vector for image i. The assessment system may use different types of features to emphasize different types of image quality assessment. For example, the assessment system may base image quality assessment on low-level distortion of the image or on a "holistic" evaluation of the images as is done by a human observer.

When assessing image quality based on low-level distortion, the assessment system uses features that are representative of various distortions such as blurring, ringing, and blocking. The assessment system can identify these distortions based on analysis of pixels close to the distortion. For example, blurring is detectable around edges, ringing is detectable near sharp edges, and blocking is detectable at the boundary of two adjacent blocks (e.g., JPEG blocks). The assessment system in one embodiment selects features based on edge points or based on blocks within an image. When features are selected based on edge points, the assessment system views each edge point of an image as a separate training sample. For example, if there are 1000 sample images in the training set and each image has an average of 20 edge points, then there will be 20,000 training samples. The assessment system may set the feature vector for a training sample to a vector of pixels within a block surrounding the edge point. If the size of the block is r (e.g., 10 pixels), then the feature vector is of size $r^2$ (e.g., 100 pixels). When the features are selected based on blocks, the assessment system views each block of an image as a separate training sample. The assessment system may set the feature vector for a training sample to a vector of the pixels within the block. If the size of the block is r, then the feature vector is of size $r^2$.

In one embodiment, the assessment system uses features that are representative of "holistic" human-observer evaluation such as a blurness, contrast, colorfulness, and saliency. The assessment system may represent blurness as a two-dimensional feature $blur_i=[ib,be]^T$ to indicate whether the $i^{th}$ image is blurred (ib) and to what extent it is blurred (be). (See, Tong, H. H., et al., "Blur Detection for Digital Images Using Wavelet Transform," Proc. IEEE Int. Conf. on Multimedia and Expo 2004.) The assessment system may represent contrast as a two-dimensional feature $contrast_i=[P_u,P_l]^T$ to indicate whether the $i^{th}$ image is over-bright ($P_u$) or over-dark ($P_l$), where $P_u$ is the percentage of the pixels whose gray value is greater than an up-threshold up_th and $P_l$ is the percentage of the pixels whose gray value is less than a low-threshold low_th. The assessment system may extract both $blur_i$ and $contrast_i$ on a gray-level image. The assessment system represents colorfulness of the $i^{th}$ image as a one-dimensional feature $colorful_i$. (See, Hasler, D., and Süsstrunk, S., "Measuring Colorfulness in Real Images," Proc. IS&T/SPIE Electronic Imaging 2003: Human Vision and Electronic Imaging VIII, SPIE, vol. 5007, pp. 87-95, 2003.) The assessment system represents saliency as a three-dimensional feature $saliency_i=[S_1,S_2,S_3]^T$ to indicate the saliency of the $i^{th}$ image, where $S_1$, $S_2$, and $S_3$ are the mean, variance, and third-order moment, respectively, of its saliency map. (See, Ma, Y. F., et al., "A User Attention Model for Video Summarization," Proc. of the 10th ACM Int. Conf. on Multimedia, pp. 533-542, 2002.)

The assessment system may also use various features to represent the relationship between image quality and low-level image features. In one embodiment, the assessment system uses the lower-level features of Table 1.

TABLE 1

General-purpose low-level features

| Category | Name | Dimension |
| --- | --- | --- |
| Color | Band Difference | 1 |
| | Color Moment | 9 |
| | Color Histogram | 64 |
| | Lab Coherence | 128 |
| | Luv Coherence | 128 |
| | HSV Coherence | 128 |
| | Correlogram | 144 |
| Energy | DFT Moment | 6 |
| | DCT Moment | 6 |
| Texture | MRSAR | 15 |
| | Tamura | 18 |
| | Wavelet | 18 |
| | WaveletPwt | 24 |
| | WaveletTwt | 104 |
| Shape | Canny Histogram | 15 |
| | Sobel Histogram | 15 |
| | Laplace Histogram | 15 |

"Band Difference" is described in Athitsos, V., et al., "Distinguishing Photographs and Graphics on the World Wide Web," IEEE Workshop on Content-Based Access of Image and Video Libraries (1997); "Color Moment" is described in Stricker, M., et al., "Similarity of Color Images," Storage and Retrieval for Image and Video Databases, Proc. SPIE 2420, pp. 381-392 (1995); "Color Histogram" is described in Swain, M., et al., "Color Indexing," Int. Journal of Computer Vision, 7(1): 11-32 (1991); "Lab Coherence," "Luv Coherence," and "HSV Coherence" are described in Pass, G., "Comparing Images Using Color Coherence Vectors," Proc. the 4th ACM Int. Conf. on Multimedia, pp. 65-73 (1997); "Correlogram" is described in Huang, J., et al., "Image Indexing Using Color Correlograms," Proc. IEEE Conf. on Computer Vision and Pattern Recognition, pp. 762-768 (1997); "DFT Moment" contains the mean and variance of the coefficients of Discrete Fourier Transformation (DFT) for red, green, and blue channels; "DCT Moment" contains the mean and variance of the coefficients of Discrete Cosine Transformation (DCT) for red, green, and blue channels; "MRSAR" is described in Mao, J., et al., "Texture Classification and Segmentation Using Multiresolution Simultaneous Autoregressive Models," Pattern Recognition, vol. 25, pp. 173-188 (1992); "Tamura" is described in Tamura, H., et al., "Texture Features Corresponding to Visual Perception," IEEE Trans. on SMC, vol. 8, pp. 460-473 (1978); "WaveletTwt" is described in Wang, J. Z., et al., "Content-Based Image Indexing and Searching Using Daubechies' Wavelets," Int. Journal of Digital Libraries, vol. 1, no. 4, pp. 311-328 (1998); "WaveletPwt" is described in Mallat, S. G., "A Theory for Multiresolution Signal Decomposition: the Wavelet Representation," IEEE Trans. on Pattern Analysis and Machine Intelligence, vol. 11, pp. 674-693 (1989); "WaveletTwt" is described in Chang, T. and Kuo, C. C., "Texture Analysis and Classification with Tree-Structured Wavelet Transform," IEEE Trans. on Image Proc., vol. 2, pp. 429-441 (1993); "Canny Histogram" is described in He, J. R., et al., "W-Boost and Its Application to Web Image Classification," Proc. IEEE Int. Conf. on Pattern Recognition 2004; and "Sobel Histogram" and "Laplace Histogram" are modified versions of "Canny Histogram" that use Sobel and Laplace operators to detect edges instead of a Canny operator.

After the feature vectors are generated, the assessment system trains a binary classifier using $\{F(i), Y(i)\}$ ($i=1, 2, \ldots, N$) to separate the positive and negative samples as far as possible, where $Y(i)=+1$ if $E(i) \in E^+(i)$ and $Y(i)=-1$ otherwise. In one embodiment, the classifier is an adaptive boosting classifier. Alternatively, the classifier may be a support vector machine, Bayesian classifier, and so on. Adaptive boosting is an iterative process that runs multiple tests on a collection of training samples. Adaptive boosting transforms a weak learning algorithm (an algorithm that performs at a level only slightly better than chance) into a strong learning algorithm (an algorithm that displays a low error rate). The weak learning algorithm or classifier is run on training samples. The algorithm concentrates more and more on those training samples in which its predecessor weak learning algorithm tended to show errors. The algorithm corrects the errors made by earlier weak classifiers (i.e., sub-classifiers). The algorithm is adaptive because it adjusts to the error rates of its predecessors. Adaptive boosting combines rough and moderately inaccurate rules of thumb to create a high-performance algorithm. Adaptive boosting combines the results (i.e., sub-classifiers) of each separately run test into a single, very accurate classifier.

In one embodiment, the assessment system uses a "real adaptive boosting" algorithm as described by Schapire, R. E., et al., "Boosting and Rocchio Applied to Text Filtering," Proc. ACM Int. Conf. on R&D in Information Retrieval, ACM Press, New York, N.Y., pp. 215-223 (1998). The assessment system initializes the weight for each training sample according to the following equation:

$$W_1(i)=1/N \qquad (2)$$

where W is the weight for the i-th training sample for the first sub-classifier and N is the number of training samples. The assessment system thus starts out giving each training sample an equal weight. The assessment system then generates each sub-classifier $g_t$ where $t=1, \ldots, T$ and T is the number of sub-classifiers. The assessment system generates a sub-classifier $g_t$ using weights $W_t(i)$ in a probability class as represented by the following equation:

$$P_t(i)=\hat{P}(Y(i)=1|i) \in [0,1] \qquad (3)$$

where $P_t(i)$ is probability that sample i is high-quality. The assessment system then maps the probability to a real value according to the following equation:

$$g_t(i) = \frac{1}{2} \log \frac{P_t(i)}{1-P_t(i)} \in R \qquad (4)$$

where $g_t(i)$ is the real value representing the quality of the sample i. The assessment system calculates the new weights for the next iteration according to the equation:

$$W_{t+1}(i)=W_t(i) \cdot e^{-Y(i)g_t(i)} \qquad (5)$$

The assessment system then outputs the trained classifier as represented by the following equation:

$$Q_m(i) = \sum_{t=1}^{T} g_t(i) \qquad (6)$$

The assessment system then maps the initial quality scores of the classifier to quality scores consistent with those assigned by human observers. The assessment system represents the mapping by a mapping function represented by the following equation:

$$Ps(j)=\alpha+\beta \cdot Qm(j)^\gamma \qquad (7)$$

Where $Ps(j)$ is the score for the image j and $\alpha$, $\beta$, and $\gamma$ are mapping parameters. The assessment system generates the mapping parameters by minimizing the mean-square-error between the classifier-calculated initial quality scores and the mean human observer quality scores as represented by the following equation:

$$MSE = \frac{1}{N_{aho}} \sum_{j=1}^{N_{aho}} (Ps(j) - Mhs(j))^2 \qquad (8)$$

where $Mhs(j)$ is the mean human observer score of image j and $N_{aho}$ is the number of images used to determine the parameters.

After the assessment system generates the classifier and the mapping function, the quality of images can be automatically calculated. To calculate the quality of an image, the assessment system generates a feature vector for an image. The assessment system then applies the trained classifier of Equation 6 to the feature vector to calculate the initial quality score. The assessment system then applies the mapping function of Equation 7 to the initial quality score to generate the final quality score for the image.

Figure 1:
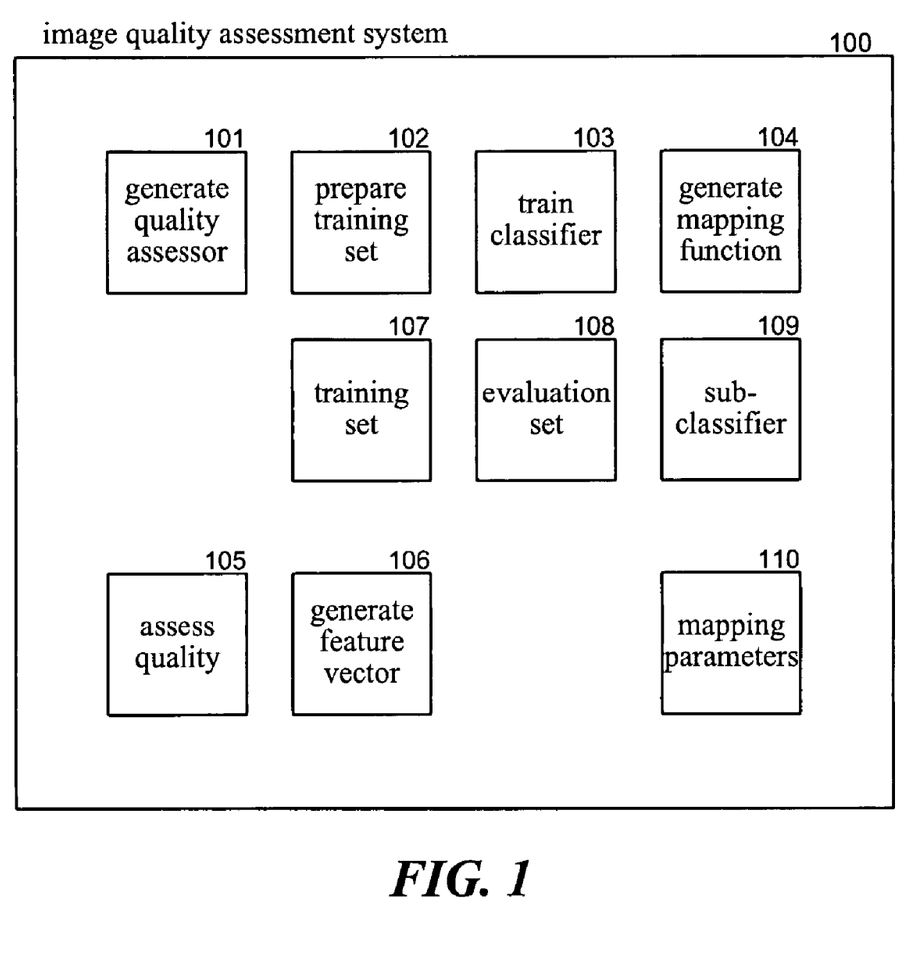
FIG. 1 is a block diagram that illustrates components of the assessment system in one embodiment.

FIG. 1 is a block diagram that illustrates components of the assessment system in one embodiment. The assessment system includes a generate quality assessor component 101, a prepare training set component 102, a train classifier component 103, a generate mapping function component 104, an assess quality component 105, and a generate feature vector component 106. The assessment system also includes a training set store 107, an evaluation set store 108, a sub-classifier store 109, and a mapping parameters store 110. The generate quality assessor component invokes the prepare training set component to prepare the training samples for training the classifier. The prepare training set component invokes the generate feature vector component to generate the feature vectors for the training samples. The generate quality assessor component then invokes the train classifier component to train the classifier. After the classifier is trained, the generate quality assessor component invokes the generate mapping function component to generate the mapping function from the initial quality scores and those of the human observers for the images of the evaluation set. The generate mapping function component stores the mapping parameters in the mapping parameters store. The training set store contains the set of training images along with a quality rating of each image. The evaluation set store contains the evaluation images along with their mean quality scores as assigned by human observers. The sub-classifier store contains the parameters for the sub-classifiers generated by the train classifier component. The assess quality component calculates the quality scores for images using the trained classifier and the mapping function. The assess quality component invokes the generate feature vector component to generate the feature vector for an image whose quality is to be assessed. The assess quality component then invokes the classifier to calculate an initial quality score for the image from its feature vector. The assess quality component then uses the mapping function to map the initial quality score to a final quality score.

The computing device on which the assessment system is implemented may include a central processing unit, memory, input devices (e.g., keyboard and pointing devices), output devices (e.g., display devices), and storage devices (e.g., disk drives). The memory and storage devices are computer-readable media that may contain instructions that implement the assessment system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the assessment system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The assessment system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
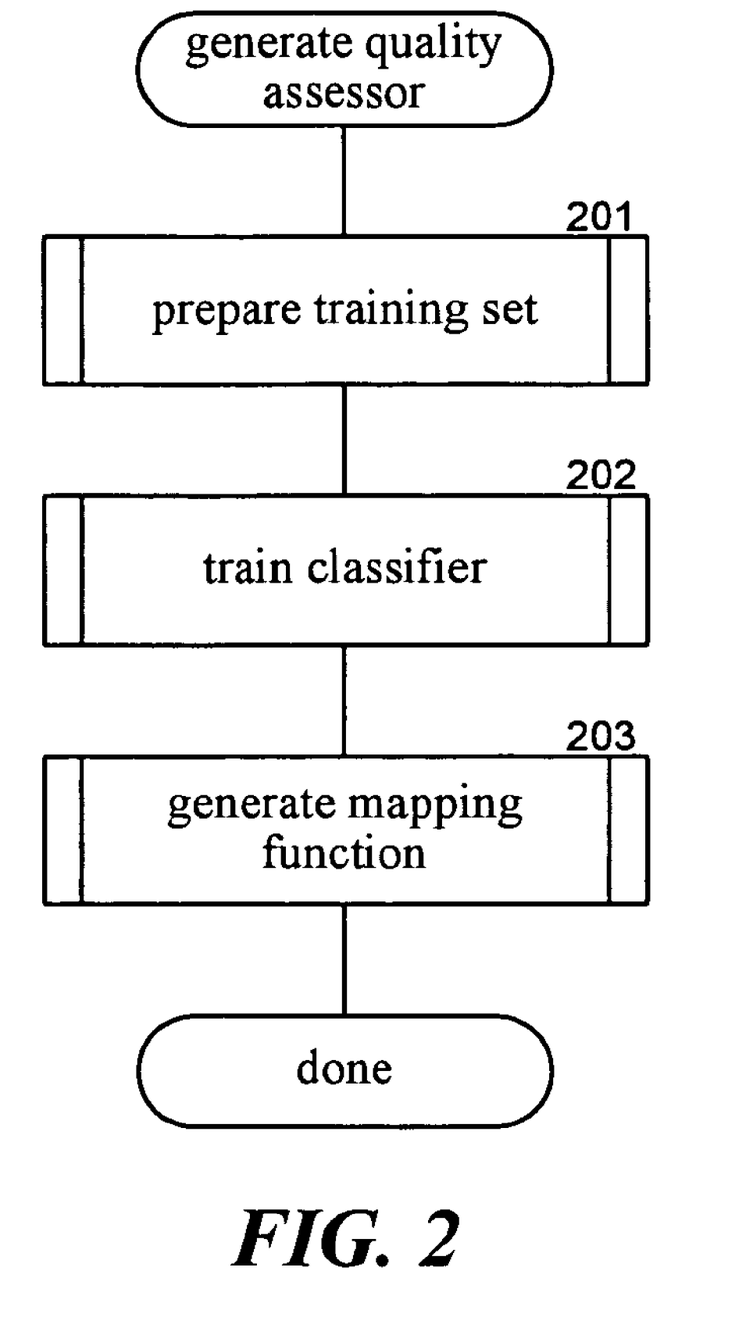
FIG. 2 is a flow diagram that illustrates the processing of the generate quality assessor component in one embodiment.

FIG. 2 is a flow diagram that illustrates the processing of the generate quality assessor component in one embodiment. The component coordinates the training of the image assessment classifier and the generation of the mapping function. In block 201, the component invokes the prepare training set component. In block 202, the component invokes the train classifier component. In block 203, the component invokes the generate mapping function component and then completes.

Figure 3:
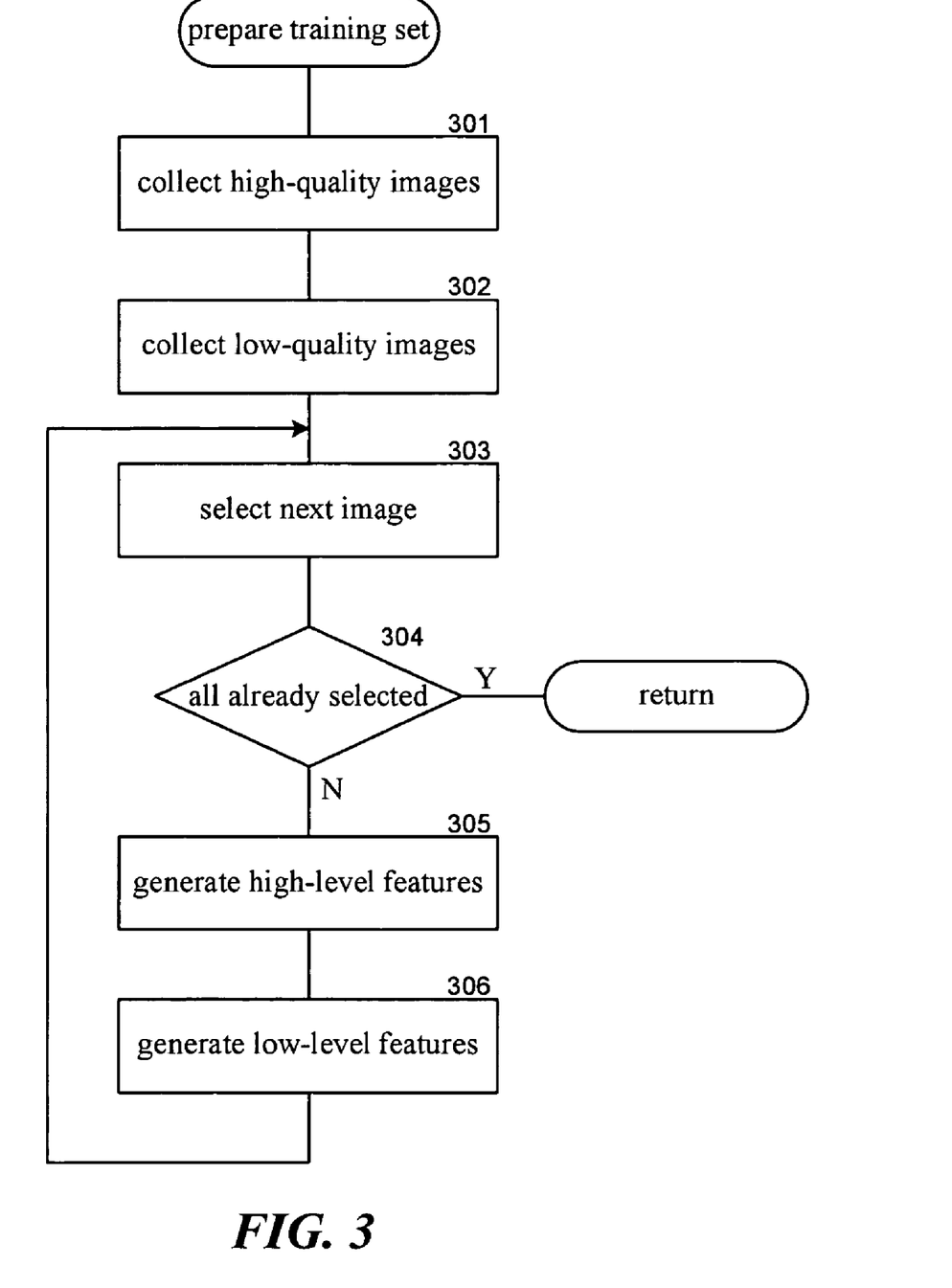
FIG. 3 is a flow diagram that illustrates the processing of the prepare training set component in one embodiment.

FIG. 3 is a flow diagram that illustrates the processing of the prepare training set component in one embodiment. The component collects high-quality and low-quality images and then generates their feature vectors based on high-level features and low-level features. The assessment system may assume that images by professionals are high-quality and all others are low-quality. In this embodiment, the component generates the feature vectors for the features representative of the "holistic assessment." In block 301, the component collects the high-quality images. In block 302, the component collects the low-quality images. In blocks 303-306, the component loops generating the feature vector for each image. In block 303, the component selects the next image. In decision block 304, if all the images have already been selected, then the component returns, else the component continues at block 305. In block 305, the component generates the feature vector elements for the high-level features. In block 306, the component generates the feature vector elements for the low-level features. The component then loops to block 303 to select the next image.

Figure 4:
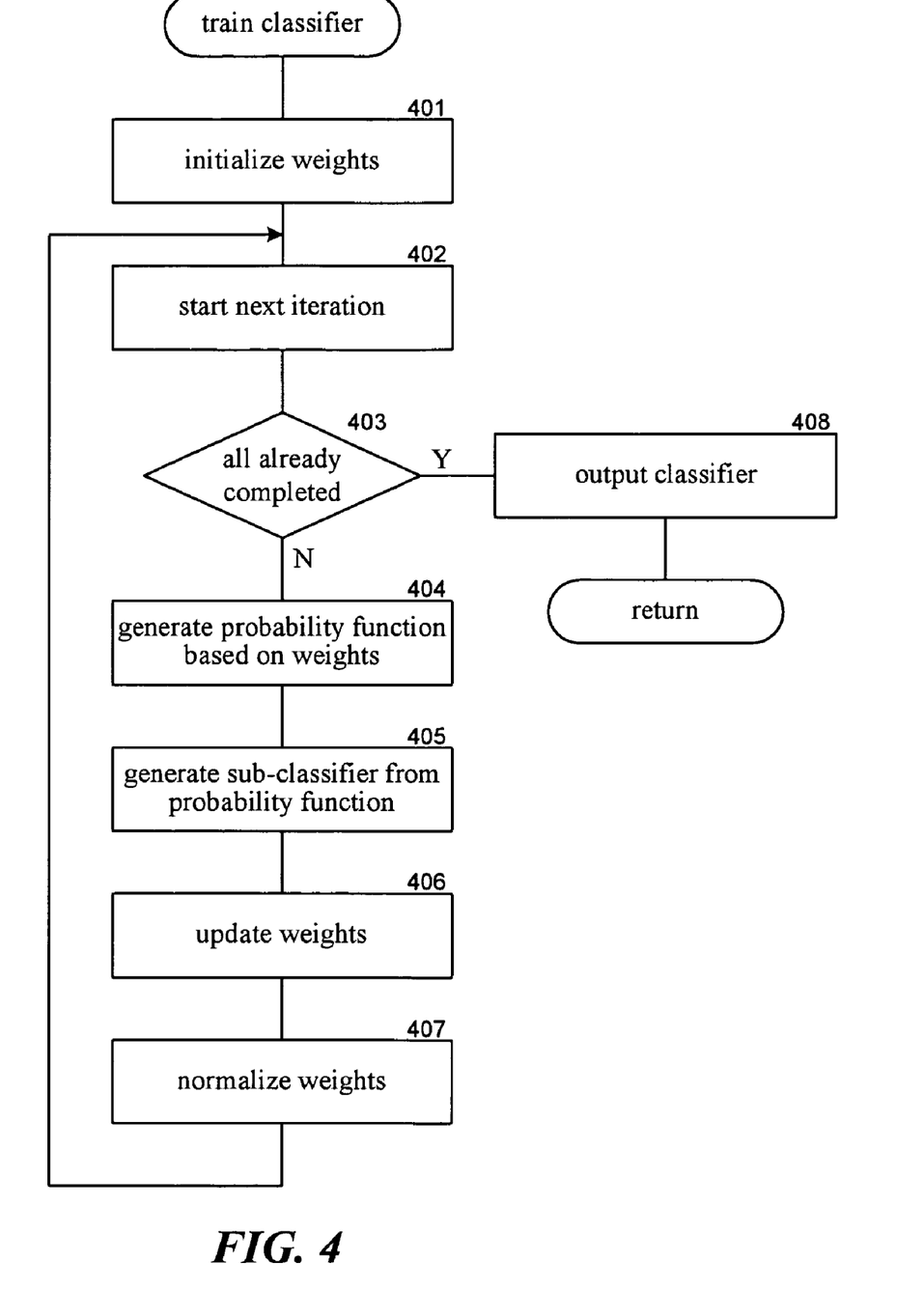
FIG. 4 is a flow diagram that illustrates the processing of the train classifier component in one embodiment.

FIG. 4 is a flow diagram that illustrates the processing of the train classifier component in one embodiment. In this embodiment, the component trains the classifier using a real adaptive boosting technique. In block 401, the component generates the initial weights for each training sample as indicated by Equation 2. In blocks 402-407, the component loops generating a sub-classifier for each iteration and updating the weights for each training sample at each iteration. In block 402, the component starts the next iteration. In decision block 403, if all the iterations have already been completed, then the component continues at block 408, else the component continues at block 404. In block 404, the component generates a probability function based on the weights, the feature vectors, and the quality ratings as indicated by Equation 3. In block 405, the component generates a sub-classifier from the probability function as indicated by Equation 4. In block 406, the component updates the weights as indicated by Equation 5. In block 407, the component normalizes the weights so they sum to 1. The component then loops to block 402 to start the next iteration. In block 408, the component outputs the classifier of Equation 6 and then returns.

Figure 5:
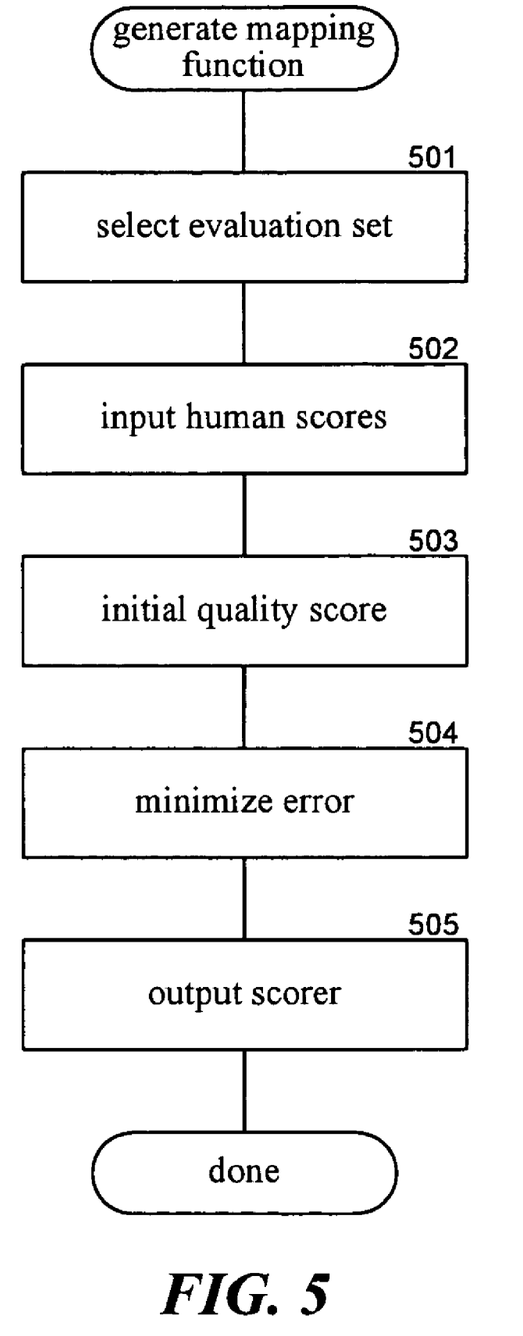
FIG. 5 is a flow diagram that illustrates the processing of the generate mapping function component in one embodiment.

FIG. 5 is a flow diagram that illustrates the processing of the generate mapping function component in one embodiment. The component generates mapping parameters to map the initial quality scores of the classifier to be consistent with the quality scores assigned by human observers. In block 501, the component selects the evaluation sample set of images. In block 502, the component inputs the quality scores for the human observers for the images of the evaluation sample set. In block 503, the component calculates the initial quality score of each image by applying the trained classifier to the feature vector of each image. In block 504, the component calculates the mapping parameters to minimize the error between the initial quality scores and the human observer quality scores for the images of the evaluation sample set as indicated by Equation 8. In block 505, the component outputs mapping function as indicated by Equation 7 and then completes.

Figure 6:
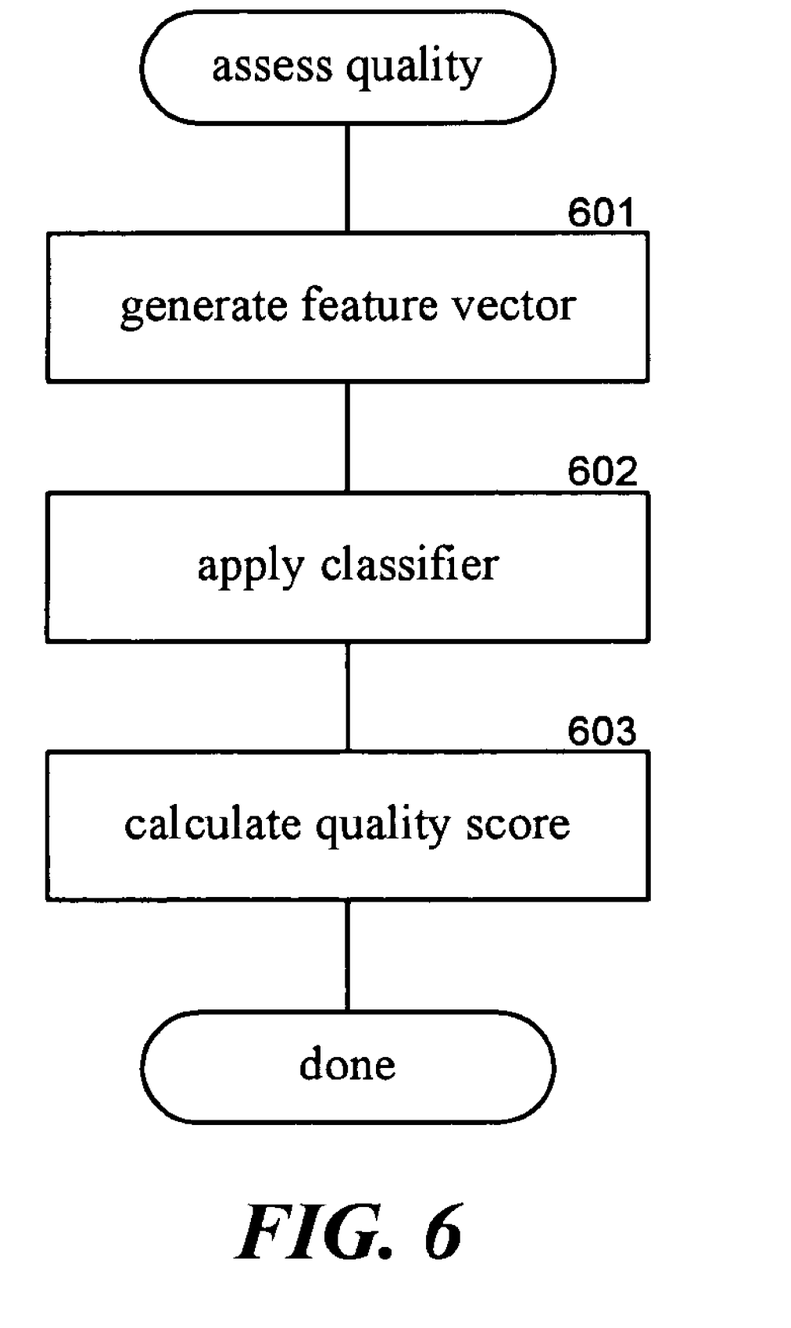
FIG. 6 is a flow diagram that illustrates the processing of the assess quality component in one embodiment.

FIG. 6 is a flow diagram that illustrates the processing of the assess quality component in one embodiment. The assess quality component is passed an image and calculates a quality score for that image. In block 601, the component generates a feature vector for the passed image. In block 602, the component applies the trained classifier to the feature vector to calculate an initial quality score. In block 603, the component applies the mapping function to generate a final quality score for the passed image and then completes.

From the foregoing, it will be appreciated that specific embodiments of the assessment system have been described herein for purposes of illustration, but that various modifications may be made without deviating from the spirit and scope of the invention. Accordingly, the invention is not limited except as by the appended claims.

We claim:

1. A computer-readable medium containing instructions for controlling a computer system with a processor and a memory to assess quality of an image, the instructions implementing steps comprising:

accessing a first set and a second set of images;

accessing a quality rating for each image of the first set;

accessing a first quality score for each image of the second set;

training a classifier to indicate quality of images using the first set of images and their quality ratings;

calculating a second quality score for each image of the second set using the trained classifier; and generating a mapping function based on the trained classifier and the first and second quality scores;

wherein a quality score for the image is calculated using the trained classifier and generated mapping function, wherein the classifier is an adaptive boosting classifier, and wherein the instructions are executed by the processor after being loaded into memory from the computer-readable medium.

2. The computer-readable medium of claim 1 wherein the first and second sets of images are the same images.

3. The computer-readable medium of claim 1 wherein the quality ratings are high-quality and low-quality.

4. The computer-readable medium of claim 1 including generating a feature vector for each image of the first set wherein the classifier is trained using the generated feature vectors.

5. The computer-readable medium of claim 4 wherein the features indicate a distortion evaluation.

6. The computer-readable medium of claim 4 wherein the features indicate a holistic quality evaluation.

7. The computer-readable medium of claim 1 wherein the mapping function is represented as:

$$Ps(j)=\alpha+\beta \cdot Qm(j)^\gamma$$

where Ps(j) is the quality score for image j, Qm(j) is the quality score generated by the classifier, and $\alpha$, $\beta$, and $\gamma$ are mapping parameters.

8. The computer-readable medium of claim 7 wherein the mapping parameters are selected to minimize $$MSE = \frac{1}{N_{aho}} \sum_{j=1}^{N_{aho}} (Ps(j) - Mhs(j))^2$$

where Mhs(j) is the mean human observer score of image j and $N_{aho}$ is the number of images used to determine the parameters.

9. The computer-readable medium of claim 1 wherein images produced by a professional have a quality rating of high and images of a non-professional have a quality rating of low.

* * * * *